United States Patent

Heian

[15] 3,653,645

[45] Apr. 4, 1972

[54] METHOD AND FURNACE FOR HEAT TREATING MATERIALS

[72] Inventor: Glenn A. Heian, Franklin, Wis.

[73] Assignee: Allis-Chalmers Manufacturing, Milwaukee, Wis.

[22] Filed: Dec. 10, 1970

[21] Appl. No.: 96,775

[52] U.S. Cl. .........................................263/32 R, 263/53 R
[51] Int. Cl. .........................................................F27b 7/02
[58] Field of Search ......................................263/32 R, 53 R

[56] References Cited

UNITED STATES PATENTS

| | | | |
|---|---|---|---|
| 1,909,820 | 5/1933 | Falla .....................................263/32 R |
| 3,100,106 | 8/1963 | Bielenberg et al. ..................263/53 R |
| 3,313,534 | 4/1967 | Frans ....................................263/32 R |
| 3,563,519 | 2/1971 | Lippmann.............................263/32 R |

*Primary Examiner*—John J. Camby
*Attorney*—Arthur M. Streich, Robert B. Benson and John P. Hines

[57] ABSTRACT

A method and apparatus for reducing the alkali content of cement clinker is disclosed as improvements to a system according to U.S. Pat. No. 3,313,534. The improved system includes a mixing box mounted on top of a furnace structure that defines a preconditioning chamber and a preburning chamber over a traveling grate, with the preburn chamber adjacent a material inlet opening end of a rotary kiln. A portion of the hot gases coming from the kiln and passing into the preburn chamber are drawn into the mixing box where such gases are mixed with atmospheric air and bypassed away from the material in the preburn chamber while the remainder of the hot gas coming from the kiln is permitted to pass through the material in the preburn chamber. Withdrawing some of the gases from the preburn chamber unloads most of the dust and some of the volatilized alkalies from the system. This hot dust laden gas is mixed with atmospheric air in the mixing box to drop the temperature from about 2,000° Fahrenheit to below the freezing temperature of the alkalies, which for NaOH and KOH would be below 600° Fahrenheit. This immediate quenching of the gas in the mixing box freezes alkali to very small particles, most of which are smaller than 10 to 20 microns, that do not then deposit on inner surfaces of a bypass conduit or on material in the preconditioning chamber. The other gas flow, passing through the material in the preburn zone, transfers heat to the material therein and this gas drops in temperature to an average temperature of about 500° to 750° Fahrenheit. This gas that has passed through the material in the preburn chamber after tempering with atmospheric air if necessary to lower the temperature to 500–600° Fahrenheit and the gas that has bypassed the preburn chamber may then be directed through one or more cyclone dust collectors to remove the dust particles larger than 10 to 20 microns and a minor portion of the frozen alkalies and then delivered to a preconditioning chamber in which the material is treated (i.e., dried) before passing into the preburn chamber. One or more auxiliary burners are mounted in the top of the furnace structure between the mixing box and the preconditioning chamber, to make up any heat deficit in preburn gases. Bypassed gases and preburn gases with entrained dust and alkali particles smaller than 10 to 20 microns are delivered to the preconditioning chamber and drawn through the material and into exhaust conduit means connected to the preconditioning chamber between the preburn chamber and the material inlet end of the preconditioning chamber. Provision is made for withdrawing controlled amounts of the bypassed gas directly to the exhaust conduit means, without such amounts passing through the material in the preconditioning chamber. A fine dust collector, which may be an electrostatic precipitator or gas permeable bags, is connected to the exhaust conduit means. The fine dust collector collects dust smaller than 10 to 20 microns, including a major portion of the alkalies.

12 Claims, 1 Drawing Figure

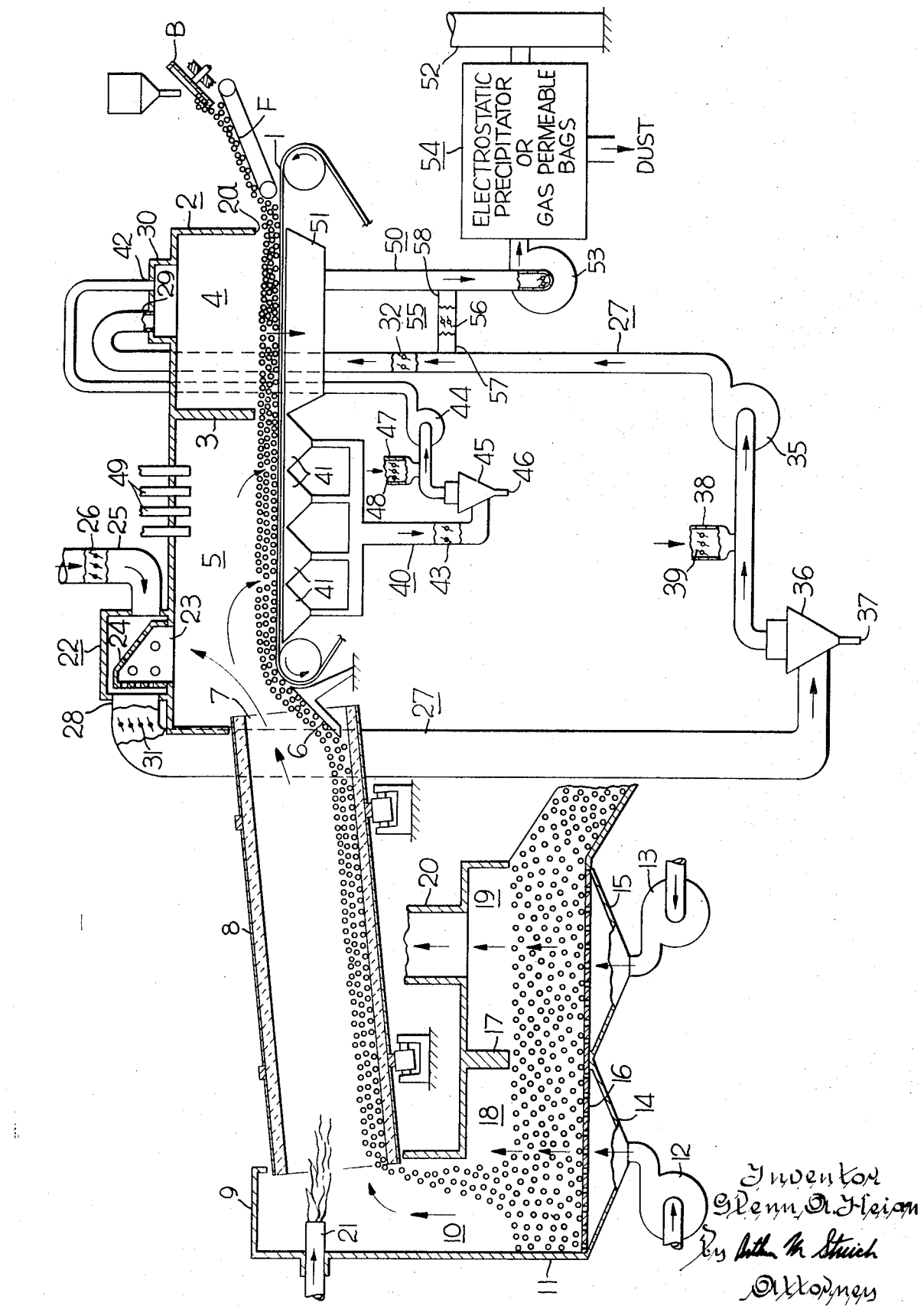

METHOD AND FURNACE FOR HEAT TREATING MATERIALS

CROSS REFERENCE TO RELATED PATENT APPLICATION

This application discloses a gas and air mixing box which is also part of a system the subject of a copending United States patent application of Glenn A. Heian and Robert F. Kohl entitled "Method and Apparatus for Removing Alkali from Cement System," Ser. No. 96,776, filed on Dec. 10, 1970.

BACKGROUND OF THE INVENTION

1. Field of the Invention

The present invention relates to a method and apparatus for burning limestone and clay to produce Portland cement low in alkali. The invention provides improvements in the methods and apparatus disclosed in U.S. Pat. to R. D. Frans, No. 3,313,534.

2. Description of the Prior Art

The aforesaid Frans patent discloses a system in which minerals are deposited upon a traveling grate and carried through a drying chamber, a preburning chamber and then are deposited in a rotary kiln for final burning. Hot gases in the kiln heat minerals to high temperatures and then pass from the kiln to preburn and then dry the material before passing up a stack at relatively low temperatures. Many materials have been successfully burned in such equipment and iron ore, limestone, and limestone with clay are merely a few examples. Other patents related to such a system include Lellep U.S. Pat. No. 2,580,235; Stowasser U.S. Pat. No. 2,925,336; Baxa U.S. Pat. No. 3,110,483; and Bade U.S. Pat. No. 3,110,751.

One problem involved in the operation of such systems as disclosed in the aforesaid patents is that of obtaining proper thermodynamic balance of heat inputs between the drying, preburning and final heating stages. This problem arises because for each material there are three requirements that establish desired temperatures within such systems. The first requirement is that for each material there is a known or ascertainable BTU input and temperature level to which the material must be finally heated in the rotary kiln. The second requirement is that each material also has a known or ascertainable temperature level and total heat input that is necessary to achieve the desired preburn before the material is exposed to much higher temperatures in the kiln. The third requirement is that each material also has a known or ascertainable desirable maximum gas temperature for drying the ore so that water vapor is not produced so rapidly that the material breaks into particle sizes so small that excessive dust is created. Thus a material requiring a relatively low drying temperature (to prevent particle breakup) will require a relatively large volume of gases (to completely dry the material) and a material that can tolerate a relatively high drying temperature may require a relatively small volume of drying gases. Although some materials burn with partly exothermic reactions (for example magnetite iron ore), it is nevertheless true for all materials that the temperature of gases that perform the final heating is a determining factor as to the temperature of gases discharged from the kiln for preburning and drying material on the grate. Therefore the degree to which the first requirement is achieved affects the degree to which the second and third requirements can be achieved. A problem of proper thermodynamic balance between the drying, preburning and final heating stages is created because the gas flow begins with a specific volume of preheated gas from the cooler mixing with burning fuel in the kiln to meet the first requirement and it is rare or perhaps never happens (according to the practices of the prior art) that the volume and temperature of the gases finally reaching the drying chamber are what is wanted to meet the third requirement.

It is, therefore, an object of the present invention to provide a new and improved apparatus for drying, preburning and final heating of minerals, with means for controlling and improving the thermodynamic balance between the drying, preburning and final heating stages.

Another problem involved in the operation of such systems as disclosed in the prior art patents referred to is the matter of controlling and eliminating unwanted mineral constituents which include: potassium and sodium oxides (alkali) in cement; arsenic and arsenic oxides in iron ore; and sulfur in lime. These are examples of materials that are volatilized during high temperature final heating in the kiln but tend to be redeposited on or chemically react with the material being preburned on the grate or gas borne dust particles which according to prior art practices are filtered out of the gas stream as it passes through material being preburned.

It is therefore still another object of the present invention to provide a new and improved apparatus for drying, preburning and final heating of materials with means for eliminating unwanted mineral constituents that are volatilized during final high temperature heating.

Another problem involved in the operation of such systems as are disclosed in the prior art patents referred to is the matter of ringing in the kiln. A ringlike deposit of dust size particles of the material tends to build up on the inner surface of the kiln. This deposit reduces kiln volume and results in the kiln drive carrying a nonproductive and useless load. In plants constructed and operated according to prior art teachings this problem periodically necessitates a plant shutdown to remove the deposit or attempts to remove such deposits while the plant is in operation. The teachings of the Frans' patent provided a gas bypass which substantially reduces such deposits in the kiln. However, when the system of the Frans' patent is applied to making cement from alkali containing raw materials, the alkali forms an unwanted deposit on the inner surface of the bypass conduit.

It is therefore another object of the present invention to provide a new and improved apparatus for drying, preburning and final heating of materials with means for controlling, to within tolerable limits, the build-up of a deposit on the inner surface of the kiln and eliminating deposits on the inner surface of a bypass conduit which is part of an assembly for removing dust and unwanted mineral constituents.

SUMMARY OF THE PRESENT INVENTION

According to a preferred embodiment of the present invention a mixing box is mounted on top of a furnace structure that defines a preburning chamber over a traveling grate adjacent a material inlet opening of a rotary kiln. A portion of the hot gases coming from the kiln and passing into the preburn chamber are drawn into the mixing box where such gases are mixed with atmospheric air and bypassed away from the material in the preburn chamber while the remainder of the hot gas coming from the kiln is permitted to pass through the material in the preburn chamber. Withdrawing some of the gases from the preburn chamber unloads most of the dust and some of the identified unwanted mineral constituents from the system. In most operations the temperature of such withdrawn gases will be in a range from about 1,600 to 2,200° Fahrenheit. This hot dust laden gas is mixed with atmospheric air in the mixing box to drop the temperature to below the freezing temperature of unwanted constituents, which for NaOH and KOH would be below about 600° Fahrenheit. This immediate quenching of the gas in the mixing box freezes constituents such as alkali to very small particles, most of which are smaller than 10 to 20 microns and they do not then deposit on inner surfaces of a bypass conduit or on material in the preconditioning chamber. The other gas flow, passing through the material in the preburn zone, transfers heat to the material therein and this gas drops in temperature to an average temperature of about 500° to 750° Fahrenheit. This gas that has passed through the material in the preburn chamber after tempering with atmospheric air, if necessary, to lower the temperature to 500°–600° Fahrenheit and the gas that has bypassed the preburn chamber may then be directed through one or more cyclone dust collectors to remove the dust particles larger than 10 to 20 microns and a minor portion of the frozen alkalies and then delivered to a preconditioning chamber in which the material is treated (i.e., dried) before passing into the preburn chamber. A damper controls the withdrawal of the bypass gas to provide the desired flow through material in the preburn chamber. Another damper controls the cold air which is mixed with the gas in the mixing box so the volume and temperature of the mixed gases made available for treating material before it enters the preburn chamber is that which is most desirable for the particular material being treated. For burning limestone and clay to Portland cement according to the present invention the amount of gas bypassing the preburn chamber in order to provide the desired volume and temperature for treating material before it enters the preburn chamber, will leave the temperature level of the hot gas passing through the material below the level required to provide the desired preburn. One or more auxiliary burners are mounted in the top of the furnace structure between the mixing box and the preconditioning chamber, to maintain the desired temperature. Bypassed gases and preburn gases with entrained dust and alkali particles smaller than 10 to 20 microns are delivered to the preconditioning chamber and drawn through the material and into exhaust conduit means connected to the preconditioning chamber between the preburn chamber and the material inlet end of the preconditioning chamber. Provision is made for withdrawing controlled amounts of the bypassed gas directly to the exhaust conduit means, without such amounts passing through the material in the preconditioning chamber. A fine dust collector, which may be an electrostatic precipitator or gas permeable bags, is connected to the exhaust conduit means. The fine dust collector collects dust particles smaller than 10 to 20 microns including a major portion of the alkalies.

Other objects, advantages and the manner in which such are attained will be apparent from the following description with reference to the drawing.

BRIEF DESCRIPTION OF THE DRAWING

The accompanying drawing shows diagrammatically a side elevation, partly in section, a furnacing system according to the present invention.

DESCRIPTION OF THE PREFERRED EMBODIMENT

Referring to the drawing, raw material is prepared for the furnace by a suitable agglomerating device which may be, as shown for example, a balling device B. A feeder F deposits the prepared raw material on a gas pervious traveling grate 1. A housing structure 2 is arranged to enclose a space over the grate 1 and define a material inlet opening 2a. A baffle wall 3 is subtended from the roof of housing 2 to a predetermined distance above grate 1. Baffle wall 3 divides the space enclosed by housing 2 into a preconditioning chamber 4 and a preburn chamber 5. Raw material on grate 1 will be transported through preconditioning chamber 4, then preburn chamber 5 and then discharged through a chute 6 into an inlet opening 7 of a rotary kiln 8.

Rotary kiln 8 slopes downwardly from chute 6 toward a hood 9 that encloses the discharge end of kiln 8 and defines a passage 10 from kiln 8 to a cooler 11. The downward slope of the rotary kiln 8 causes material received from chute 6 to pass through kiln 8, then into hood 9 and through passage 10 to the cooler 11.

The cooler 11 is provided with a pair of blowers 12, 13 that blow air upwardly through windboxes 14, 15 and then through material on an air pervious grate 16. A baffle 17 may be provided to define a preliminary cooling chamber 18 and a final cooling chamber 19 over grate 16. As indicated by arrows, cool air supplied by blower 13 is blown upwardly through windbox 15, grate 16 and chamber 19 to be discharged up a stack 20 to the atmosphere. Cool air supplied by blower 12 is blown upwardly through windbox 14, grate 16, chamber 18, and passage 10 into the firing hood 9. A burner 21 is mounted in hood 9 to project into hood 9 to deliver and burn fuel that raises the temperature of gases passing into kiln 8 to the desired high temperature level required for a material receiving a final heat treatment in kiln 8. In plants producing Portland cement, the gases entering the kiln will be heated between 2,600°–2,800° Fahrenheit.

Gas flow from the gas discharge end of kiln 8, up chute 6 and into the material preburn chamber 5, will be in a temperature range of about 1,600°–2,200° Fahrenheit.

Gas conveying means will now be described that connect preburning chamber 5 to preconditioning chamber 4. A mixing box 22 is mounted on top of the housing structure 2, above the preburn chamber 5 and adjacent inlet opening 7 of the kiln 8. The mixing box 22 is provided with an opening 23 into the preburn chamber 5 and a ported gas mixing cage 24 is mounted within box 22 over the opening 23. Atmospheric air admitting means, shown as the conduit 25 and damper 26, are connected to the mixing box 22.

Bypass conduit means 27 are provided which have a first end 28 connected to mixing box 22 on the opposite side of cage 24 from the air admitting conduit 25. Bypass conduit means 27 has a second end 29 connected to a manifold 30 mounted on top of the housing structure 2 above the preconditioning chamber 4. Dampers 31 and 32 are provided in the bypass conduit means 27 for controlling the flow of gas and air therethrough.

A bypass fan 35 is provided in bypass conduit means 27 between the dampers 31, 32 for drawing into mixing box 22 a first portion of the gases passing from kiln 8 into chamber 5 and atmospheric air through conduit 25, and a mixture of such gas and air from mixing box 22 passes into the bypass conduit means 27 for delivery to the manifold 30 and preconditioning chamber 4. Dust collecting and discharging means, shown as a cyclone dust collector 36, is provided in the bypass conduit means 27 between mixing box 22 and fan 35. A dust collector 36 has a solids discharge opening 37 and is operative for discharging dust particles larger than 10 to 20 microns and a minor portion of the unwanted mineral constituents, such as alkali when making cement, as will more fully appear as the description of the invention proceeds. A second cold air inlet 38 with a damper 39 is connected to the bypass conduit means 27 at a location downstream of dust collector 36 and upstream of fan 35, to provide for insuring that the gas and air drawn into fan 35 will not overheat fan 35.

A second conduit means 40 is provided which includes on its first end, a plurality of windboxes 41 arranged beneath grate 1 and preburn chamber 5 to connect the first end 41 of conduit 40 to chamber 5. The second conduit means 40 has a second end 42 connected to the manifold 30 over preconditioning chamber 4. A damper 43 is provided in the second conduit means 40 for controlling the flow of gas therethrough. A preburn gas exhaust fan 44 is provided in conduit means 40 between damper 43 and manifold 30, for drawing into conduit means 40 a second portion of the gases passing from kiln 8 into chamber 5, for delivery to manifold 30 and preconditioning chamber 4. One or more cyclone dust collectors 45 having a solids discharge opening 46, may be provided in conduit means 40 upstream of fan 44. A third cold air inlet 47 with a damper 48 is connected to the second conduit means 40 at a location downstream of dust collector 45 and upstream of fan 44, to provide for insuring that gas drawn into fan 44 will not overheat fan 44. To insure that the second portion of the gases passing from kiln 8 into chamber 5 and through material or grate 1 in chamber 5, contain sufficient heat as required for the desired preburn of the material, auxiliary heating means, shown as several fuel burners 49, are mounted on housing structure 2 to project into chamber 5 above the grate 1 and between the mixing box 22 and the preconditioning chamber 4.

A third conduit means 50 is provided which includes on its first end a windbox 51 beneath grate 1 and connected to the preconditioning chamber 4 between the preburn chamber 5 and the material inlet opening 2a of the preconditioning chamber 4. A second end of the third conduit means 50 is connected to a stack 52 for discharging gas to the atmosphere. A preconditioning gas exhaust fan 53 is provided in conduit means 50 for drawing gas therethrough for discharge up stack 52. A fine dust collector 54 is connected to the conduit means 50. As indicated on the drawing collector 54 may be either an electrostatic precipitator or gas permeable bags.

Secondary bypass conduit means 55, including a damper 56, is provided and connected on a first end 57 thereof to the bypass conduit means 27 between the fan 35 and damper 32. A second end 58 of conduit means 55 is connected to third conduit means 50 upstream of fan 53.

A method of operation of the disclosed apparatus will be described as applied to the production of Portland cement low in alkali, from alkali containing raw materials.

Pellets containing the necessary raw materials for making cement are formed in the balling device B and placed upon grate 1 by the feeder F to form a gas permeable bed of pellets about seven inches deep for transport through chamber 4. The heat transfer from gas to pellets in chamber 4 must be carefully controlled to properly precondition the pellets before they are transported into the preburn chamber 5. That is, in chamber 4 the pellets are dried as they are heated with gas at a temperature of 500°–600° Fahrenheit. The pellets must not be heated too fast or exposed to too high temperatures in order to avoid pellet break-up and dust formation.

The dry pellets thus preconditioned for preburning are transported into the preburn chamber 5 where they are exposed to temperatures of about 1,800°–2,200° Fahrenheit and the pellets are partially calcined.

After the pellets have been given the desired preburn treatment the body of pellets on grate 1 is disrupted and the pellets are tumbled through kiln 8 and heated to about 2,600°–2,800° Fahrenheit and cement clinker is produced. During this final heat treatment in the kiln some dust is produced and unwanted mineral constituents that may be present, such as alkali, volatize to gas and vapor. The hot pellets are discharged from kiln 8 and fall through passage 10 to the grate 16 of cooler 11. After the pellets pass through chambers 18 and 19 of cooler 11 they are cooled sufficiently for handling and storage.

The air from chamber 18 of cooler 11, that has been preheated to about 1,500° Fahrenheit as it passes through the pellets on grate 16, passes up passage 10 and into kiln 8. The flame and gases from burner 21 mix with the air from cooler 11 to provide an atmosphere in kiln 8 that is over 2,600° Fahrenheit. These high temperature gases move counter to the flow of pellets through kiln 8 and with the dust and volatiles from the kiln pass into preburn chamber 5 at over 1,800° Fahrenheit.

Damper 31 is adjusted so fan 35 draws a first portion of the gases from kiln 8, in an amount of from 15 to 40 percent of the gas from kiln 8, into mixing box 22 and bypass conduit 27. The mixing box 22 is located adjacent kiln opening 7 to catch the gas while it is rising from opening 7 in order that a maximum of the gas entrained dust and volatilized alkali is drawn into the mixing box 22.

It has been discovered that there is a stratifying of dust and alkali, relative to the gas stream as a whole emerging from kiln 8. The mixing box 22 is arranged to get the best cut of alkali and dust laden gas from relatively cleaner gas, by being located above the kiln opening 7 in the path of the gas stream before the gas stream changes direction and turns downwardly as shown by arrows in chamber 5.

The portion of the gas drawn into mixing box 22 and bypass conduit 27 unloads most of the dust and alkali from the system. The alkali compounds as they are chilled in mixing box 22 either condense to form additional dust particles, or as vapor chemically unite with or physically attach to the dust, or a combination of the foregoing possibilities may take place, the exact mechanism is not known or understood; however, two factors are apparent. One factor that is apparent is that most of the alkali is drawn into mixing box 22 and, after being cooled in a manner that will be described, is frozen as particles of low density, most of which are smaller than 10 to 20 microns and only a minor portion of the alkalies present is discharged from the system through the solids discharge opening 37 in cyclone dust collector 36. The second factor that is apparent is that the major amount of alkali drawn out through mixing box 22 remains suspended in the gas flowing through cyclone dust collector 36, the bed of material in chamber 4 and is caught in the fine dust collector 54.

Returning to a description of the gas flow system, the gases, vapors and dust drawn out through mixing box 22, travel through the bypass conduit means 27 but before passing out of mixing box 22 the cold air inlet conduit 25 admits air at about 70° Fahrenheit into mixing box 22. Damper 26 controls the flow of cold air into mixing box 22 to drop the temperature of the bypass gas from over 1,800° Fahrenheit to 500°–600° Fahrenheit. The volatilized potassium hydroxide will freeze to dustlike solid particles when this gas is cooled to about 750° Fahrenheit and the volatilized sodium hydroxide will freeze to dustlike solid particles when this gas is cooled to about 600° Fahrenheit. This bypass gas in conduit means 27 cooled to 500°–600° Fahrenheit and containing solid alkali (not now sticky) then passes into one or more cyclone dust collectors 36.

Dust collectors 36 separate dust particles a small amount of the alkali compounds, from the gas stream and discharge these materials through opening 37. Since this dust is relatively low in alkalies it may be recirculated through the entire system along with other feed deposited upon the feed end of grate 1.

Gas is discharged from dust collector 36 and may be mixed with additional cool air which may be admitted at inlet 38 before being delivered to the inlet of fan 35 in order to protect fan 35 from overheating. The gas from fan 35 continues through conduit means 27 to manifold 30 over chamber 4.

Damper 43 in the second conduit means 40, is adjusted so fan 44 draws a second portion of the gases from kiln 8 and the combustion gases from fuel burners 49 downwardly through the material on grate 1 in preburn chamber 5 and into the windboxes 41, with burners 49 supplying the added heat needed for the desired partial calcining of the material in chamber 5. From windboxes 41, these gases pass through dust collector 45, then are tempered with cold air from inlet conduit 47, and then are blown by fan 44 into the manifold 30. Manifold 30 directs the gases from both the bypass conduit means 27 and the second conduit means 40 downwardly through the material on grate 1 in the preconditioning chamber 4 and into the windbox 51 of the third conduit means 50. From windbox 51 these gases pass to fan 53, fine dust collector 54 and are blown out stack 52 to the atmosphere. The fine dust, i.e., smaller than 10 to 20 microns, removed by the collector 54 (either an electrostatic precipitator or gas permeable bags) contains a higher percentage of alkalies than the larger dust particles removed by collector 36.

Dampers 55 in the secondary conduit means 54 provide for directing 15 to 25 percent of bypass gases from the bypass conduit means 27 to the exhaust system 50 without passing through the material in the preconditioning (drying) chamber 4.

Because a mixing box 22 and bypass 27 are provided in a system with windboxes 41, 51 that are part of separate gas flow conduit means 40, 50 respectively, greater flexibility is provided for improved alkali removal. Greater amounts of heat can be used to drive off more alkali without the danger of overheating wet pellets in the drying zone 4 (which causes pellets to explode and form dust). That is, dampers 43 and 48 can be adjusted to lessen the amount of heat moved through drying zone 4 from windboxes 41 by fans 44, 53, and dampers 32 and 56 can be adjusted to lessen the amount of heat moved through drying zone and from mixing box 22 by fans 35, 53, without requiring a reduction in heat applied in the kiln 8 for driving off alkali. Furthermore, with the described bypass system there is no need for an emergency relief stack over the grate for use during heat-up, upset, emergency shutdown, and idling operation, such as is shown in the system of U.S. Pat. No. 3,313,534.

With the apparatus and operation that has been described it can now be understood that the present invention provides means for controlling each stage of the furnacing operation to provide the right temperature and quantity of gas for each stage; means for unloading dust from the system for controlling ringing in kiln 8; and means for recycling dust and removing unwanted mineral constituents from the material that are volatilized during the high temperature tumbling of the material in kiln 8.

From the foregoing it will be understood that the present invention is possessed of unique advantages. However, such modifications and equivalents of the disclosed concepts such as readily occur to those skilled in the art are intended to be included within the scope of this invention and thus the scope of this invention is intended to be limited only by the scope of the claims such as are, or may hereafter be, appended hereto.

The embodiments of the invention in which an exclusive property or privilege is claimed are defined as follows:

1. In a mineral furnacing apparatus having structures defining at least a chamber for preconditioning material having a material inlet opening, a chamber for preburning material and a chamber for final heating material having a material inlet opening facing the preburning chamber, with said chambers being connected together in series flow arrangement to define a material flow stream from said preconditioning chamber to the preburning chamber and then to the final heating chamber, with the structures defining a passage for a counterflow of gas from said final heating chamber to said preburning chamber, and gas conveying means connecting said preburning chamber to said preconditioning chamber, said gas conveying means comprising:
   a. a mixing box connected to the preburn chamber at a location adjacent the material inlet opening of the final heating chamber and on a side of the material stream facing the flow of gas through the passage;
   b. a bypass conduit means connected on a first end thereof to the mixing box, and a second end of the bypass conduit connected to the preconditioning chamber;
   c. a second conduit means connected on a first end thereof to the preburn chamber at a location on a side of the material stream opposite to the flow of gas through the passage and between the mixing box and the preconditioning chamber, and a second end of the second conduit means being connected to the preconditioning chamber;
   d. an atmospheric air admitting means connected to the mixing box;
   e. dust collecting and discharging means in the bypass conduit means between the mixing box and the preconditioning chamber operative for collecting dust particles larger than 10 to 20 microns and passing particles smaller than 10 to 20 microns;
   f. third conduit means connected to the preconditioning chamber at a location on a side of the material stream opposite the second end of the bypass conduit means and between the preburn chamber and the material inlet opening of the preconditioning chamber, for exhausting gas from the preconditioning chamber; and
   g. fine dust collecting means operative to collect particles smaller than 10 to 20 microns, connected to the third conduit means for removing such size particles from gas flow through the third conduit means.

2. In a mineral furnacing apparatus according to claim 1, auxiliary heating means projecting into the preburn chamber on the side of the material stream facing the flow of gas through the passage and between the mixing box and the preconditioning chamber.

3. In a mineral furnacing apparatus according to claim 1, a bypass fan in the bypass conduit means between the mixing box and the preconditioning chamber for drawing gas out of the preburn chamber into the mixing box and atmospheric air into the mixing box and blowing the gas and air from the mixing box through the bypass conduit means into the preconditioning chamber.

4. In a mineral furnacing apparatus according to claim 1, a ported cage of heat resistant material mounted within the mixing box for creating turbulence of the air and gas and promote mixing thereof.

5. In a mineral furnacing apparatus according to claim 1, a secondary bypass conduit means connecting the bypass conduit means from the mixing box, at a location between the dust collecting and discharging means and the preconditioning chamber, to the third conduit means at a location between the preconditioning chamber and the fine dust collecting means.

6. In a mineral furnacing apparatus having a traveling grate enclosed by structures defining at least a chamber for preconditioning material having a material inlet opening and a chamber for preburning material, and a rotary kiln for final heating material having a material inlet opening facing the preburning chamber, with said chambers and kiln being connected together in series flow arrangement to define a material flow stream from said preconditioning chamber to the preburning chamber and then to the kiln, with the structures defining a passage for a counterflow of gas from kiln to said preburning chamber, and gas conveying means connecting said preburning chamber to said preconditioning chamber, said gas conveying means comprising:
   a. a mixing box connected to the preburn chamber at a location adjacent the material inlet opening of the kiln and above the grate;
   b. a bypass conduit means connected on a first end thereof to the mixing box, and a second end of the bypass conduit connected above the grate to the preconditioning chamber;
   c. a second conduit means connected on a first end thereof to the preburn chamber at a location beneath the grate and between the mixing box and the preconditioning chamber, and a second end of the second conduit means being connected above the grate to the preconditioning chamber;
   d. an atmospheric air admitting means connected to the mixing box;
   e. a cyclone separator in the bypass conduit means between the mixing box and the preconditioning chamber for collecting dust particles larger than 10 to 20 microns and passing particles smaller than 10 to 20 microns;
   f. third conduit means connected beneath the grate to the preconditioning chamber between the preburn chamber and the material inlet opening of the preconditioning chamber, for exhausting gas from the preconditioning chamber; and
   g. fine dust collecting means operative to collect particles smaller than 10 to 20 microns, connected to the third conduit means for removing such size particles from gas flow through the third conduit means.

7. In a mineral furnacing apparatus according to claim 6, a ported cage of heat resistant material mounted within the mixing box for creating turbulence of the air and gas and promote mixing thereof.

8. In a mineral furnacing apparatus according to claim 6, auxiliary heating means projecting into the preburn chamber above the grate and between the mixing box and the preconditioning chamber.

9. In a method of reducing the alkali content of cement clinker made from alkali containing raw material in which such material is fed successively through preconditioning, preburning and final heat treating zones and hot dust and alkali laden gases from the final heat treating zone are directed into the preburning zone, the steps comprising:
   a. bypassing a first portion of the gases and volatilized alkalies from the final heat treating zone away from material in the preburning zone;
   b. mixing a quantity of air at atmospheric temperature with said bypassed portion of gases to chill and freeze volatilized alkalies to particles smaller than 10 to 20 microns;
   c. collecting and removing dust particles larger than 10 to 20 microns from said mixture of bypassed gases and atmospheric air;

d. drawing a second portion of the gases from the final heat treating zone into contact with and through the material in the preburning zone and then out of the preburning zone;

e. admitting a supply of auxiliary heat into the preburning zone and into contact with the second portion of gases after the first portion of gases has been directed away from the second portion of gases and before the second portion of gases are drawn through the material in the preburning zone;

f. then directing the mixture of bypassed first portion gases and atmospheric air from which dust particles larger than 10 to 20 microns have been removed and the second portion of gases that have passed through the material in the preburning zone, to heat the material in the preconditioning zone; and g. then collecting and removing from the gases dust and frozen alkali particles smaller than 10 to 20 microns.

10. In a method according to claim 9, the step of collecting and removing dust particles larger than 10 to 20 microns from the second portion of gases after the second portion of gases has passed through material in the preburning zone and before the second portion of gases is directed to treat the material in the preconditioning zone.

11. In a method according to claim 9, mixing a quantity of air at atmospheric temperature with bypassed gases at a temperature of at least about 1,600–2,200° Fahrenheit to produce a mixture of a temperature below about 600° Fahrenheit to freeze volatilized hydroxide alkalies to solid particles smaller than 10 to 20 microns before collecting and removing particles therefrom.

12. In a method according to claim 9, exhausting a controlled amount of the bypassed gases before the bypassed gases are directed to treat the material in the preconditioning zone.

* * * * *